(12) United States Patent
Geiger et al.

(10) Patent No.: US 7,158,880 B2
(45) Date of Patent: Jan. 2, 2007

(54) NAVIGATION SYSTEM

(75) Inventors: Erich Geiger, Kaempfelbach (DE); Dirk Lappe, Karlsruhe (DE); Joachim Wietzke, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 543 days.

(21) Appl. No.: 09/785,544

(22) Filed: Feb. 16, 2001

(65) Prior Publication Data

US 2001/0025223 A1 Sep. 27, 2001

(30) Foreign Application Priority Data

Feb. 18, 2000 (DE) ................................ 100 07 348

(51) Int. Cl.
*G06F 12/00* (2006.01)
*G06F 13/00* (2006.01)

(52) U.S. Cl. ...................... 701/211; 73/178 R; 340/990

(58) Field of Classification Search ................ 701/200, 701/209, 24, 211, 208, 36, 212, 201; 73/178 R; 340/995, 988, 990; 342/82, 175, 177, 190, 342/357.09, 357.12
See application file for complete search history.

(56) References Cited

U.S. PATENT DOCUMENTS

| | | | | |
|---|---|---|---|---|
| 4,954,959 A | | 9/1990 | Moroto et al. ............... 364/449 |
| 4,992,947 A | * | 2/1991 | Nimura et al. .............. 701/210 |
| 5,568,390 A | * | 10/1996 | Hirota et al. ............... 701/201 |
| 5,933,100 A | | 8/1999 | Golding ....................... 340/995 |
| 6,018,695 A | | 1/2000 | Ahrens et al. .............. 701/200 |
| 6,047,234 A | | 4/2000 | Cherveny et al. .......... 701/200 |
| 6,052,645 A | | 4/2000 | Harada ........................ 701/212 |
| 6,061,003 A | | 5/2000 | Harada ....................... 340/995 |
| 6,067,500 A | * | 5/2000 | Morimoto et al. .......... 701/209 |
| 6,124,826 A | * | 9/2000 | Garthwaite et al. .... 342/357.09 |
| 6,127,969 A | * | 10/2000 | Van Roekel ........... 342/357.13 |
| 6,128,571 A | * | 10/2000 | Ito et al. ..................... 701/201 |
| 6,202,026 B1 | * | 3/2001 | Nimura et al. .............. 701/211 |
| 6,253,152 B1 | * | 6/2001 | Ito .............................. 701/209 |
| 6,298,305 B1 | * | 10/2001 | Kadaba et al. .............. 701/211 |
| 6,334,089 B1 | * | 12/2001 | Hessing ....................... 701/209 |
| 6,366,622 B1 | * | 4/2002 | Brown et al. ................ 375/322 |
| 6,522,889 B1 | * | 2/2003 | Aarnio ..................... 455/456.5 |
| 6,707,421 B1 | * | 3/2004 | Drury et al. ............. 342/357.1 |

FOREIGN PATENT DOCUMENTS

| | | |
|---|---|---|
| DE | 198 35 422 A1 | 2/1999 |
| EP | 0 489 915 A1 | 6/1992 |
| EP | 0896314 | 2/1999 |
| EP | 0 967 460 A1 | 12/1999 |
| FR | 2 700 047 | 7/1994 |
| JP | 11306094 | 11/1999 |
| WO | WO 99/21306 | 4/1999 |
| WO | WO 99/67761 | 12/1999 |

* cited by examiner

*Primary Examiner*—Dalena Tran
(74) *Attorney, Agent, or Firm*—O'Shea Getz & Kosakowski P.C.

(57) ABSTRACT

A navigation system for use in a motor vehicle receives starting position data and destination position data and computes driving directions between the starting and destination positions. The navigation system includes a first memory unit that stores a basic navigation database including road map information, and a receiver that receives supplemental navigation data including digital road maps, and provides received supplemental navigation data that is stored in a second memory unit. A navigation computer computes driving directions between the starting position and the destination position using information from the basic navigation database and the received supplemental navigation data, and outputs driving directions for presentation to a user.

24 Claims, 1 Drawing Sheet

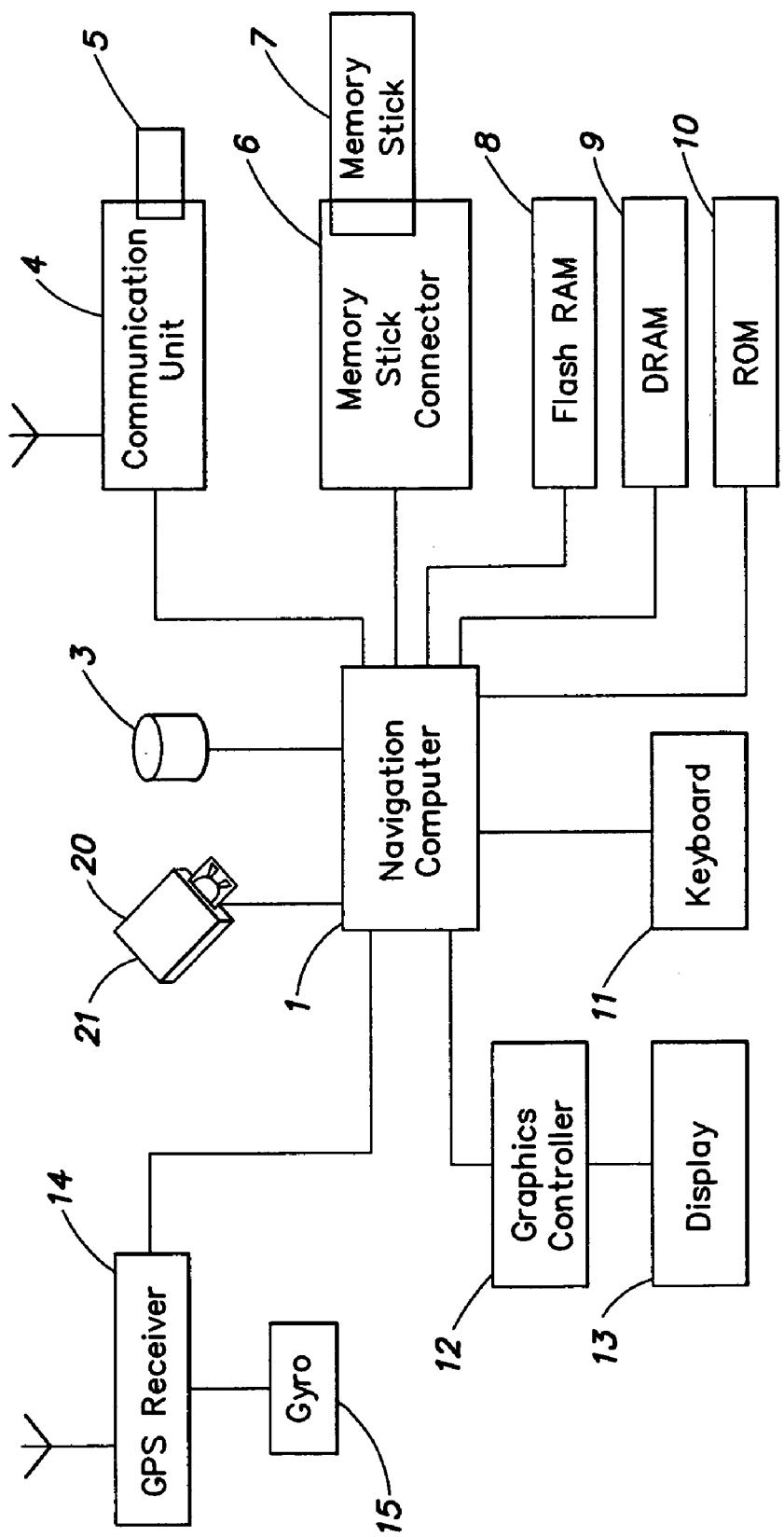

NAVIGATION SYSTEM

BACKGROUND OF THE INVENTION

The invention relates to the field of motor vehicle navigation systems, and in particular to a navigation system that receives supplemental navigation data over a wireless communication channel.

Motor vehicle navigation systems are growing in popularity due to their ability to direct the driver along a route between a starting point and a destination. For example, published German patent application DE 197 34 365 A1 discloses a mobile radio receiver for use in a motor vehicle, which is combined with a navigation unit. The radio receiver includes user interfaces and a multimedia unit, which includes a digital radio receiving unit and a backward channel unit. The navigation unit consists of a navigation processor and a memory unit. A position location unit, a sensor unit, and a communication unit are connected to the navigation unit. The user interfaces are connected to the multimedia unit and are controlled by a control unit.

In the arrangement described in German patent application DE 197 34 365 A1, the data needed for information and traffic directions are transmitted together with the digital radio signals. Interactive services are initiated and controlled by the user through a backward channel (i.e., the system is used interactively).

The memory unit stores only basic data, such as for example throughways, state routes, interstate routes, and all place names. With this data the navigation processor can calculate the directions to the destination using roads of higher order. Low order data necessary for navigation, such as street names, highways of lower order, and urban streets, are transmitted to the navigation processor from a central station.

In a first embodiment, DE 197 34 365 A1 discloses that the navigation processor requests the other data necessary for navigation from a service provider, via the communication unit or via the backward channel unit implemented in the digital radio broadcast. The control unit filters the transmitted navigation data out of the radio broadcast signal and provides this received navigation data to the navigation processor.

In a second embodiment, DE 197 34 365 A1 discloses that the other data needed for navigation (e.g., street names, highways of lower order, urban streets, etc.) are broadcast continuously in addition to and together with the digital radio signal. In cooperation with the digital radio receiving unit and the control unit, the navigation processor detects from the continuously transmitted data stream the data needed for navigation.

Both of these embodiments suffer from the problem that the data needed for navigation must be retrievable at all times. Therefore, if the receiving unit breaks down or if the service provider is unable to provide the requested data, directions to the destination are then possible only on the basis of higher order streets.

Therefore, there is a need for a navigation system that includes a sufficiently updated database to provide improved availability of route search and destination directions.

SUMMARY OF THE INVENTION

Briefly, according to an aspect of the invention, a navigation system for use in a motor vehicle receives starting position data and destination position data and computes driving directions between the starting and destination positions. The navigation system includes a first memory unit that stores a basic navigation database including road map information, and a receiver that receives supplemental navigation data including digital road maps, and provides received supplemental navigation data that is stored in a second memory unit. A navigation computer computes driving directions between the starting position and the destination position using information from the basic navigation database and the received supplemental navigation data, and outputs driving directions for presentation to a user.

The supplemental navigation data augments the data in the first memory unit. The information existing in the first memory unit thus is not discarded, but continues to be used, or in some circumstances is partly superposed.

The navigation system thus is self-teaching and adapts itself through updates and partial updates to the existing information base (e.g., the digital road map cited above) to provide a user-adaptive road map. The advantage of this is that after a brief startup phase the navigation system has available a basic data set for navigation. Thus, the transmission of redundant data is largely avoided.

The inventive navigation system specifies that the network connection is built up, for example, through "Bluetooth" or through the "Global System for Mobile Communications" (GSM). Both systems assure constantly available access to the requested database, which is made available independent of time and place, for example over the Internet.

The supplementary data may also include data for route search and destination directions. These include the particular current traffic information, traffic interruptions, possible traffic connections with public or private traffic means, etc.

The supplemental data may also include data for graphic representation. This assures that improved representations, for example resolution, realistic images of streets with their abutting houses, etc. are actually available to the user as soon as they are made available by a provider, and that the user is not required, in supplementary fashion, to purchase from a dealer current digital map material (e.g., in the form of a CD-ROM or a DVD).

The basic data may be based on compact disks (CD) or a digital video versatile disk (DVD). Alternatively, the basic data may be stored in a hard disk (HD), a flash-random access memory (flash-RAM), or a read-only memory (ROM).

A hard disk, a flash-RAM, or a dynamic random access memory (DRAM) may be used as the second memory unit. The second memory unit may in some circumstances be identical to the first memory unit so, for example, a CD drive or a DVD drive can be dispensed with. The basic database is thus made available directly on the ROM, the hard disk, the flash-RAM, or the DRAM, and is updated as needed or regularly with supplementary data transmitted through a network connection. Therefore, a separate memory (i.e., delta memory) for the newly added supplementary data is not required.

The navigation computer, the data input unit, the data output unit, the first and second memory unit, and the communication unit may be arranged in a ring topology. Data can be exchanged for example, over a data bus.

The navigation system may also include a position locating unit. In this embodiment, the navigation computer requests only the data through the communication unit that it needs based upon the current position of the system. Therefore, the update is specific with respect to time and place, and the navigation system does not absolutely need the basic data necessary for the current position. Further-more, a complete update of the entire region is also possible. In this way, the navigation system is self-teaching and adapts itself to the areas that the driver is currently approaching.

In one embodiment, a packet-oriented data connection replaces the line-oriented network connection. This means that the navigation system receives the data supplementary to the basic database through a data medium. Such equipment makes sense especially if navigation is needed in an area where a network connection cannot be maintained. The data medium may include, for example, a CD, a DVD, or an IC memory card (e.g., a memory stick).

These and other objects, features and advantages of the present invention will become more apparent in light of the following detailed description of preferred embodiments thereof, as illustrated in the accompanying drawings.

BRIEF DESCRIPTION OF THE DRAWING

The FIGURE is a block diagram illustration of a navigation system.

DETAILED DESCRIPTION OF THE INVENTION

The navigation system includes a navigation computer 1 (e.g., a microprocessor) that computes driving directions between a starting point and a destination point, and provides driving directions to a user via a display 13. The system includes a compact disk drive 20 or a digital video versatile disk drive 21, a hard disk 3, and a read-only memory 10 that are connected to the navigation computer 1. These memories retain a basic database that includes, for example, map information about throughways, state roads, interstate roads, street names, highways, etc.

Data supplementary to this basic database (e.g., more current road map information about the starting and destination regions) can be provided subsequently to the navigation computer 1 through the global system for mobile communications, a CD-ROM, a DVD, or a memory stick 7, a flash-random access memory 8, a dynamic random access memory 9, and/or the hard disk 3. The supplementary data are stored in non-volatile memory, for example, flash-RAM 8, DRAM 9, and/or hard disk 3, so a self-adapting current road map material gradually becomes available.

A GSM wireless network is accessed through a GSM engine 4 that communicates with the navigation computer 1. A subscriber identity module (SIM) 5 is connected to the GSM engine to check access authorization and facilitate billing for the supplementary data made available by a wireless network data provider.

The supplementary data may also be made available on a memory stick 7 that includes for example regional data, and interfaces with a memory stick connector 6.

The navigation system may also include input devices such as a keyboard 11 through which the driver of the motor vehicle can enter the destination coordinates, for example the destination location. In addition, the system also includes a monitor 13 and a graphic controller 12 to display the route.

To determine the current location and the motion of the motor vehicle, the navigation system may include a global positioning system 14 and/or a gyroscope 15 to provide data to the navigation computer 1.

Although the present invention has been shown and described with respect to several preferred embodiments thereof, various changes, omissions and additions to the form and detail thereof, may be made therein, without departing from the spirit and scope of the invention.

What is claimed is:

1. A navigation system for use in a motor vehicle, comprising:
   a data input unit through which a user enters destination position data;
   a first non-volatile memory unit that stores a basic navigation database including road map information;
   a communication unit that receives supplemental navigation data including digital road map information, and provides received supplemental navigation data;
   a second non-volatile memory unit that receives and stores the received supplemental navigation data;
   a navigation computer that receives start position data and the received destination position data, and computes driving directions between the starting position and the destination position using information from the basic navigation database and the received supplemental navigation data; and
   a data output unit for outputting the driving directions to the user.

2. The navigation system of claim 1, where the communication unit comprises a wireless receiver that receives the supplemental navigation data.

3. The navigation system of claim 2, where the wireless receiver comprises a GSM receiver.

4. The navigation system of claim 2, where the wireless receiver comprises means for receiving the supplemental navigation data via a Bluetooth compatible communication protocol.

5. The navigation system of claim 2, where the data output unit comprises a display for presenting the driving directions to the user.

6. The navigation system of claim 5, where the supplemental navigation data comprises graphic data for presentation on the display.

7. The navigation system of claim 2, where the first non-volatile memory unit comprises a compact disk.

8. The navigation system of claim 2, where the first non-volatile memory unit comprises a digital video disk.

9. The navigation system of claim 2, where the first non-volatile memory unit comprises a hard disk.

10. The navigation system of claim 2, where the first non-volatile memory unit comprises flash-random access memory.

11. The navigation system of claim 2, where the first non-volatile memory unit comprises a read-only memory.

12. The navigation system of claim 2, where the second non-volatile memory unit comprises a hard disk.

13. The navigation system of claim 2, where the second non-volatile memory unit comprises a flash-random access memory.

14. The navigation system of claim 2, where the second non-volatile memory unit includes a dynamic random access memory.

15. The navigation system of claim 2, where the navigation computer, the data input unit, the data output unit, the first and second non-volatile memory units, and the communication unit are arranged in a ring communication network.

16. The navigation system of claim 2, further comprising a position locating unit.

17. The navigation system of claim 16, where the position locating unit comprises a GPS receiver.

18. The navigation system of claim 1, where the received supplemental navigation data comprises data for use by the navigation computer to provide routine search and destination directions relating to a starting position, an intermediate destination, and a final destination specified by the user.

19. The navigation system of claim 1, where the communication unit comprises a memory input port configured to receive a data medium that includes the supplemental navigation data.

20. The navigation system of claim 19, where the data medium comprises a compact disk.

21. The navigation system of claim 19, where the data medium comprises a digital video/versatile disk.

22. The navigation system of claim 19, where the data medium comprises an IC memory card.

23. A method for data management of a motor vehicle navigation system, comprising:
   receiving destination position data through a data input unit, which is connected to a navigation computer;
   calculating driving routes in the navigation computer between a current position of the motor vehicle and the destination position data;
   transmitting to the user the driving routes calculated by the navigation computer;
   storing in a first non-volatile memory unit connected to the navigation computer, a basic database that includes digital road map information, which is needed to calculate the driving route;
   receiving data supplementary to the basic database including road map information over a network connection to a communication unit that is connected to the navigation computer; and
   storing the received supplementary data in a second non-volatile memory unit that is connected to the navigation computer.

24. A navigation system for use in a motor vehicle that receives destination position data and computes driving directions between a starting position and the destination position, the navigation system comprising:
   a first non-volatile memory unit that stores a basic navigation database including road map information;
   an RF receiver that receives supplemental navigation data including digital road maps, and provides received supplemental navigation data;
   a second non-volatile memory unit that receives and stores the received supplemental navigation data;
   means for receiving for computing driving directions between the starting position and the destination position using information from the basic navigation database and the received supplemental navigation data; and
   means for outputting the driving directions to the user.

* * * * *